United States Patent
Wang et al.

(10) Patent No.: US 10,215,863 B1
(45) Date of Patent: Feb. 26, 2019

(54) BEIDOU GROUND-BASED AUGMENTATION SYSTEM INTEGRITY RISK MONITORING SYSTEM

(71) Applicant: Beihang University, Beijing (CN)

(72) Inventors: Zhipeng Wang, Beijing (CN); Yanbo Zhu, Beijing (CN); Yu Yin, Beijing (CN); Yuan Liu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/136,531

(22) Filed: Sep. 20, 2018

(30) Foreign Application Priority Data

Aug. 30, 2018 (CN) .......................... 2018 1 1004838

(51) Int. Cl.
G01S 19/20 (2010.01)
G06F 17/18 (2006.01)
G01S 19/48 (2010.01)

(52) U.S. Cl.
CPC .............. *G01S 19/20* (2013.01); *G01S 19/48* (2013.01); *G06F 17/18* (2013.01)

(58) Field of Classification Search
CPC ........... G01S 19/20; G01S 19/48; G06F 17/18
USPC .................................................... 342/357.58
See application file for complete search history.

(56) References Cited

U.S. PATENT DOCUMENTS

| 2004/0058645 | A1* | 3/2004 | Brenner | G01S 19/21 |
| | | | | 455/11.1 |
| 2011/0118979 | A1* | 5/2011 | Mao | G01C 21/005 |
| | | | | 701/532 |
| 2012/0146851 | A1* | 6/2012 | Fernandez | G01S 19/02 |
| | | | | 342/357.58 |

FOREIGN PATENT DOCUMENTS

CN 105738925 A * 7/2016

OTHER PUBLICATIONS

Lisa Sullivan, Hypothesis Testing—Chi Squared Test, Apr. 6, 2018, Boston University School of Public Health, N/A, pp. 3-4 (steps 1-5) (Year: 2018).*

* cited by examiner

*Primary Examiner* — Harry K Liu
(74) *Attorney, Agent, or Firm* — Locke Lord LLP; Tim Tingkang Xia, Esq.

(57) ABSTRACT

A Beidou ground-based augmentation system integrity risk monitoring system includes a ground side and an on-board side. A processor of the on-board side receives a ground side monitoring statistical magnitude and an on-board side monitoring statistical magnitude to establish a threshold model, which is established by: recognizing a satellite number and inputting overall data on the monitoring statistical magnitude within one period of satellite; uniformly converting the inputted overall data from an initial equidistant measurement to an equal-ratio measurement; calculating a correlation coefficient between the two monitoring statistical magnitudes to determine a degree of freedom and a weight coefficient required for hypothesis testing; calculating an observed value of a Chi-square test statistical magnitude; deciding whether the observed value is within a rejection region; calculating a risk ratio and a reliability value; and obtaining the threshold model by utilizing an inverse transformation for converting a unified measurement.

9 Claims, 6 Drawing Sheets

BEIDOU GROUND-BASED AUGMENTATION SYSTEM INTEGRITY RISK MONITORING SYSTEM

CROSS-REFERENCE TO RELATED PATENT APPLICATION

This non-provisional application claims priority to and the benefit of, pursuant to 35 U.S.C. § 119(a), patent application Serial No. CN 201811004838.2 filed in China on Aug. 30, 2018. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to the field of satellite navigation technologies, and more particularly, to a Beidou ground-based augmentation system integrity risk monitoring system.

BACKGROUND

GBAS (ground-based augmentation systems) are augmentation technologies for improving positioning accuracy of satellite navigation systems within a local range (generally within 150 km) by utilizing differential technologies. The basic principles are as below: a differential correctional is calculated out by means of a ground reference station with known determined location, and then the differential correctional is broadcasted to users, such that onboard users may correct a received satellite positioning signal, thereby improving the positioning accuracy. Accuracy of 1-5 m may be obtained through pseudorange local area differential. If carrier phase local area differential technologies are used, even a centimeter-level result may be obtained. Therefore, in precision approach occasions, GBAS stations may be built to enhance the availability of the satellite navigation systems.

Integrity index is a very important index among four major indexes of satellite navigation. This is because integrity is directly related to safety of the onboard users, and thus it is one of the most concerned indexes for users. At present, integrity performance assessment is based on integrity risk monitoring, a monitoring statistical magnitude is set based on a ground or onboard monitoring station, then monitoring data are compared with a preset threshold, then faults are monitored in time and the corresponding satellite-receiver channels are eliminated in time.

The existing integrity risk monitoring threshold model is based on a lot of integrity monitoring statistical magnitudes. These monitoring statistical magnitudes are specifically classified into two categories: ground side monitoring statistical magnitudes and on-board side monitoring statistical magnitudes. By setting appropriate thresholds for different monitoring statistical magnitudes, cases in which the thresholds are exceeded are characterized as integrity risks. However, with continuous development and improvement of GBAS approach service types, to cover all potential risks as more as possible, more and more monitoring statistical magnitudes appear, and forms of the monitoring magnitudes become more and more complex. If these statistical magnitudes are separately processed based on the existing methods to respectively establish threshold models without regard to the correlation between these statistical magnitudes, two possible problems may be caused, i.e., false dismissal and false alarm. In the former case, other statistical magnitudes are not taken into account when a threshold model of a single monitoring statistical magnitude is established, which causes information insufficiency and the established threshold model too large, leaving out integrity risks needing to consider, and thus causing occurrence of integrity risks. In the latter case, when the integrity risks are calculated, repeated calculation may likely cause the calculated integrity risks too high to reflect actual situations.

Therefore, to solve the above problems and to avoid occurrence of the above situations, it is necessary to derive, based on collected data on the monitoring statistical magnitudes, a method for establishing a threshold model for Beidou ground-based augmentation system integrity risk monitoring.

SUMMARY

An objective of the present disclosure is to provide a Beidou ground-based augmentation system integrity risk monitoring system. The system includes a ground side and an on-board side. The on-board side includes a processor and a memory. The processor receives a ground side monitoring statistical magnitude and an on-board side monitoring statistical magnitude to establish a threshold model, and the memory stores the threshold model. The threshold model is established based on following methods:

a) recognizing a satellite number and inputting overall data on the monitoring statistical magnitude within one period of satellite, the data on the monitoring statistical magnitude including the ground side monitoring statistical magnitude and the on-board side monitoring statistical magnitude;

b) uniformly converting the inputted overall data on the monitoring statistical magnitude from an initial equidistant measurement to an equal ratio measurement;

c) calculating a correlation coefficient between the two monitoring statistical magnitudes to determine a degree of freedom and a weight coefficient required for hypothesis testing;

d) calculating an observed value of a Chi-square test statistical magnitude based on a sample standard deviation of each monitoring statistical magnitude under the equal ratio measurement and an initial value of a population standard deviation set for the weight coefficient and based on the degree of freedom and the initial value of the population standard deviation required for hypothesis testing;

e) determining a rejection region based on a given significance level, deciding whether the observed value of the Chi-square test statistical magnitude is within the rejection region; and repetitively testing if the observed value of the Chi-square test statistical magnitude is within the rejection region; otherwise going to a next step;

f) adding a control parameter on the initial threshold model, and calculating a risk ratio based on the number of sample points in excess of a threshold value and the total number of sample points; adjusting the control parameter if the risk ratio does not satisfy an index requirement; otherwise going to a next step;

g) calculating a reliability value, calculating a standard error based on the reliability value; adding a sample data size if the standard error is not up to standard and repeating the Step a) to the Step f); otherwise going to a next step; and h) obtaining the threshold model by utilizing an inverse transformation for converting a unified measurement.

Preferably, before uniformly converting the inputted overall data on the monitoring statistical magnitude from an initial equidistant measurement to an equal ratio measurement, a first-order moment and a second-order moment of a monitoring magnitude sample are calculated by using a sample parameter moment estimation.

Preferably, the sample parameter moment estimation includes a mean value estimation of the monitoring magnitude sample and a standard deviation estimation of the monitoring magnitude sample.

Preferably, the first-order moment of the monitoring magnitude sample is calculated through a following method:

$$\mu_{sample} = \frac{1}{n}\sum_{i=1}^{n} X_i,$$

wherein X represents any a monitoring statistical magnitude, and n represents a sample data size; and the second-order moment of the monitoring magnitude sample is calculated through a following method:

$$\sigma_{sample} = \frac{1}{n}\sum_{i=1}^{n} (X_i - \mu_{sample})^2,$$

wherein X represents any a monitoring statistical magnitude, n represents a sample data size, and $\mu_{sample}$ represents the first-order moment of the monitoring magnitude sample.

Preferably, the equal ratio measurement is calculated through a following method:

$$X^* = 100 - \left|\frac{X - \mu_{sample}}{\sigma_{sample}}\right|,$$

wherein X represents any a monitoring statistical magnitude, $\mu_{sample}$ represents the first-order moment of the monitoring magnitude sample corresponding to X, $\sigma_{sample}$ represents the second-order moment of the monitoring magnitude sample corresponding to X, and X* represents the monitoring statistical magnitude after being converted to the equal ratio measurement.

Preferably, the correlation coefficient between the two monitoring statistical magnitudes is calculated through a following method:

$$\rho_{X_1^* X_2^*} = \frac{\text{cov}(X_1^*, X_2^*)}{\sigma X_1^* \sigma X_2^*},$$

wherein cov($X_1^*$, $X_2^*$) represents a covariance between the monitoring statistical magnitudes $X_1$ and $X_2^*$ after being converted to the equal ratio measurement, $\sigma X_1^*$ represents a standard deviation of the monitoring statistical magnitude $X_1^*$ after measurement conversion, and $\sigma X_2^*$ represents a standard deviation of the monitoring statistical magnitude $X_2^*$ after measurement conversion.

Preferably, the initial value of the population standard deviation is determined through a following method:

$$\sigma_0 = \sum_{j=1}^{m} W_j g \sigma_j,$$

wherein j represents a number of the monitoring statistical magnitude, m represents the total number of the monitoring statistical magnitudes, $W_j$ represents the weight coefficient, and $\sigma_j$ represents the sample standard deviation of each monitoring statistical magnitude under the equal ratio measurement.

Preferably, the observed value of the Chi-square test statistical magnitude is calculated through a following method:

$$\chi^2 = \frac{(f-1)S_n^{*2}}{\sigma_0^2},$$

wherein f represents the degree of freedom, $\sigma_0$ represents the initial value of the supposed population standard deviation, $S_n^{*2}$ represents a corrected sample variance, the corrected sample variance $S_n^{*2}$ satisfies:

$$S_n^{*2} = \frac{1}{n-1}\sum_{i=1}^{n} (X_i^* - \overline{X}^*)^2,$$

wherein n represents the sample data size, $X_i^*$ represents the monitoring statistical magnitude after being converted to the equal ratio measurement, and $\overline{X}^*$ represents a mean value of the monitoring statistical magnitude after being converted to the equal ratio measurement.

Preferably, the reliability value is calculated through a following method:

$$\beta = \frac{m}{m-1} \cdot \frac{\sigma_0^2 - \sum \sigma_i^2}{\sigma_0^2},$$

wherein m represents the total number of the monitoring statistical magnitudes, $\sigma_0$ represents the initial value of the supposed population standard deviation, and $\Sigma\sigma_i^2$ represents a summation of each of the monitoring statistical magnitudes.

According to the present disclosure, an effective integrity risk monitoring threshold model for the Beidou ground-based augmentation system is obtained based on collected data on the monitoring statistical magnitude and using all the monitoring statistical magnitudes, which can effectively reduce a false dismissal probability and a false alarm probability in the integrity monitoring process.

The threshold model established according to the present disclosure may be applied to integrity monitoring processing procedures of different airports.

It should be understood that the foregoing general description and the following detailed description are exemplary illustration and explanation, and should not be used as limitations on contents claimed by the present disclosure.

BRIEF DESCRIPTION OF THE DRAWINGS

More objectives, functions and advantages of the present disclosure will be elucidated from following description of the embodiments of the present disclosure with reference to the appended accompanying drawings.

DETAILED DESCRIPTION

The objectives and functions of the present disclosure and methods used for implementing these objectives and functions will be set forth by referring to exemplary embodiments. However, the present disclosure is not limited to the exemplary embodiments disclosed hereinafter, and can be implemented in different forms. The essence of the specification is only to help those skilled in the art to comprehensively understand the specific details of the present disclosure.

Figure 1:
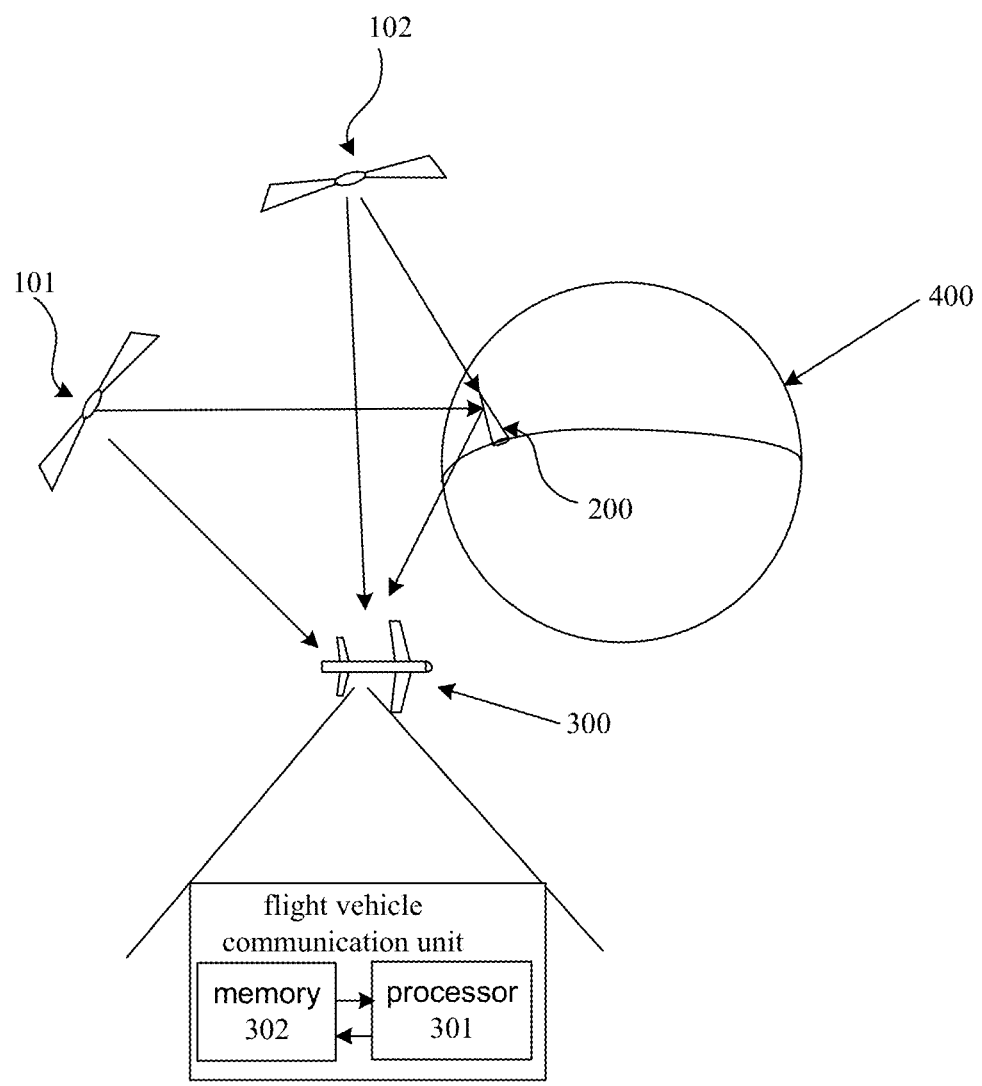
FIG. 1 illustrates a schematic diagram of a Beidou ground-based augmentation system integrity risk monitoring system according to the present disclosure.

Hereinafter, the embodiments of the present disclosure will be described with reference to the accompanying drawings, and related technical terms should be well known to those skilled in the art. The same reference numerals in the accompanying drawings indicate the same or similar components or the same or similar steps, unless otherwise stated. Contents of the present disclosure are described with reference to specific embodiments. To make a more clear description of the present disclosure, first it is described a Beidou ground-based augmentation system integrity risk monitoring system according to the present disclosure. FIG. 1 illustrates a schematic diagram of the Beidou ground-based augmentation system integrity risk monitoring system according to the present disclosure. The Beidou ground-based augmentation system integrity risk monitoring system includes a ground side 200 (a ground receiving station) and an on-board side 300 (a flight vehicle). The ground side 200 is erected on a ground 400. The on-board side 300 includes a processor 301 and a memory 302. The ground side 200 obtains a ground side monitoring statistical magnitude of a satellite, and the on-board side 300 obtains an on-board side monitoring statistical magnitude of the satellite. A flight vehicle communication unit obtains the ground side monitoring statistical magnitude and the on-board side monitoring statistical magnitude and transmits the ground side monitoring statistical magnitude and the on-board side monitoring statistical magnitude to the processor 301. The processor 301 receives the ground side monitoring statistical magnitude and the on-board side monitoring statistical magnitude to establish a threshold model, which is stored in the memory 302. According to the embodiments of the present disclosure, based on the Beidou ground-based augmentation system integrity risk monitoring system, the threshold model is established based on following methods:

a) recognizing a satellite number and inputting overall data on the monitoring statistical magnitude within one period of satellite, the data on the monitoring statistical magnitude including the ground side monitoring statistical magnitude and the on-board side monitoring statistical magnitude;

b) uniformly converting the inputted overall data on the monitoring statistical magnitude from an initial equidistant measurement to an equal ratio measurement;

c) calculating a correlation coefficient between the two monitoring statistical magnitudes to determine a degree of freedom and a weight coefficient required for hypothesis testing;

d) calculating an observed value of a Chi-square test statistical magnitude based on a sample standard deviation of each monitoring statistical magnitude under the equal ratio measurement and an initial value of a population standard deviation set for the weight coefficient and based on the degree of freedom and the initial value of the population standard deviation required for hypothesis testing;

e) determining a rejection region based on a given significance level, deciding whether the observed value of the Chi-square test statistical magnitude is within the rejection region; and repetitively testing if the observed value of the Chi-square test statistical magnitude is within the rejection region; otherwise going to a next step;

f) adding a control parameter on the initial threshold model, and calculating a risk ratio based on the number of sample points in excess of a threshold value and the total number of sample points; adjusting the control parameter if the risk ratio does not satisfy an index requirement; otherwise going to a next step;

g) calculating a reliability value, calculating a standard error based on the reliability value; adding a sample data size if the standard error is not up to standard and repeating the Step a) to the Step f); otherwise going to a next step; and h) obtaining the threshold model by utilizing an inverse transformation for converting a unified measurement.

Procedures of establishing the threshold model will be specifically described hereinafter.

In the data inputting phase, based on different satellite numbers (for example, No. 1 satellite 101, No. 2 satellite 102, and so on) of collected data on the monitoring statistical magnitude, the monitoring data for different satellites will be separately processed. This is because different satellites have different threshold models in the procedures of establishing the threshold models. According to the present disclosure, it is needed to first input overall data on the monitoring statistical magnitude (including the ground side monitoring statistical magnitude and the on-board side monitoring statistical magnitude) within one period of satellite (for example, No. 1 satellite 101), and also a reliability detection mechanism is established to ensure reliability in establishing the threshold model.

In the measurement conversion phase, the inputted overall data on the monitoring statistical magnitude are uniformly converted from an initial equidistant measurement to an equal ratio measurement. The actual measurement of the original monitoring statistical magnitude is carried out in an equidistant measurement manner, and different monitoring magnitudes have different measurement units and thus cannot be integrated for comprehensive treatment. These monitoring statistical magnitudes need to be uniformly converted into the equal ratio measurement, such that all the monitoring statistical magnitudes can be comprehensively compared conveniently, and the information obtained by means of measurement can be used more effectively, the efficiency of information utilization is improved, and occurrence of false dismissal and false alarm is effectively avoided.

The correlation coefficient between the two monitoring statistical magnitudes is calculated. If the two monitoring statistical magnitudes are correlated, repeated calculation of integrity risk may likely cause the calculated integrity risk too high, which may increase the false alarm probability. Therefore, to ensure the effectiveness of establishing the threshold model, after the measurement conversion, it is needed to first determine the correlation between the monitoring statistical magnitudes, and then the degree of freedom of each monitoring statistical magnitude and the weight coefficient of each monitoring statistical magnitude are obtained to serve as the basis of the subsequent steps.

In the hypothesis testing phase, the present disclosure utilizes a hypothesis testing method to determine important parameters in establishing the threshold model. Specifically, due to the data characteristics of the Beidou GBAS monitoring statistical magnitudes (in all the monitoring statistical magnitudes, the mean value μ has a higher stability, which may be approximately deemed to remain unchanged in a relatively small scope). Therefore, determining the threshold model mainly depends on testing the population standard deviation. The monitoring statistical magnitudes overall approximately is subject to normal distribution. Therefore, the present disclosure adopts a Chi-square test exclusively used in testing the normal population standard deviation. The present disclosure utilizes an initial hypothesis regarding the population standard deviation, and then performs a significance test by means of the Chi-square test. If the test result satisfies the rejection region (including the integrity risk), the original hypothesis is negated and re-circulated until the hypothesis is not within the rejection region (not including the integrity risk). This proves that the population variance at this moment satisfies requirements for the significance test, and thus the threshold model is initially established.

Perfect detection mechanism To ensure the effectiveness and reliability of establishing the threshold model, the present disclosure establishes a perfect detection mechanism, which specifically includes a standard index detection and a reliability detection. The standard index detection means detecting whether the obtained threshold model satisfies international index requirements (for example, the requirement of GAST C for the integrity risk index is $2 \times 10^{-7}$, and the requirement for GAST D for the integrity risk index is $2 \times 10^{-9}$). The reliability detection is carried out to ensure the consistency and universality of the obtained threshold model. If the reliability detection is not up to standard, the sample data size needs to be increased to obtain a more reliable threshold model.

Figure 2:
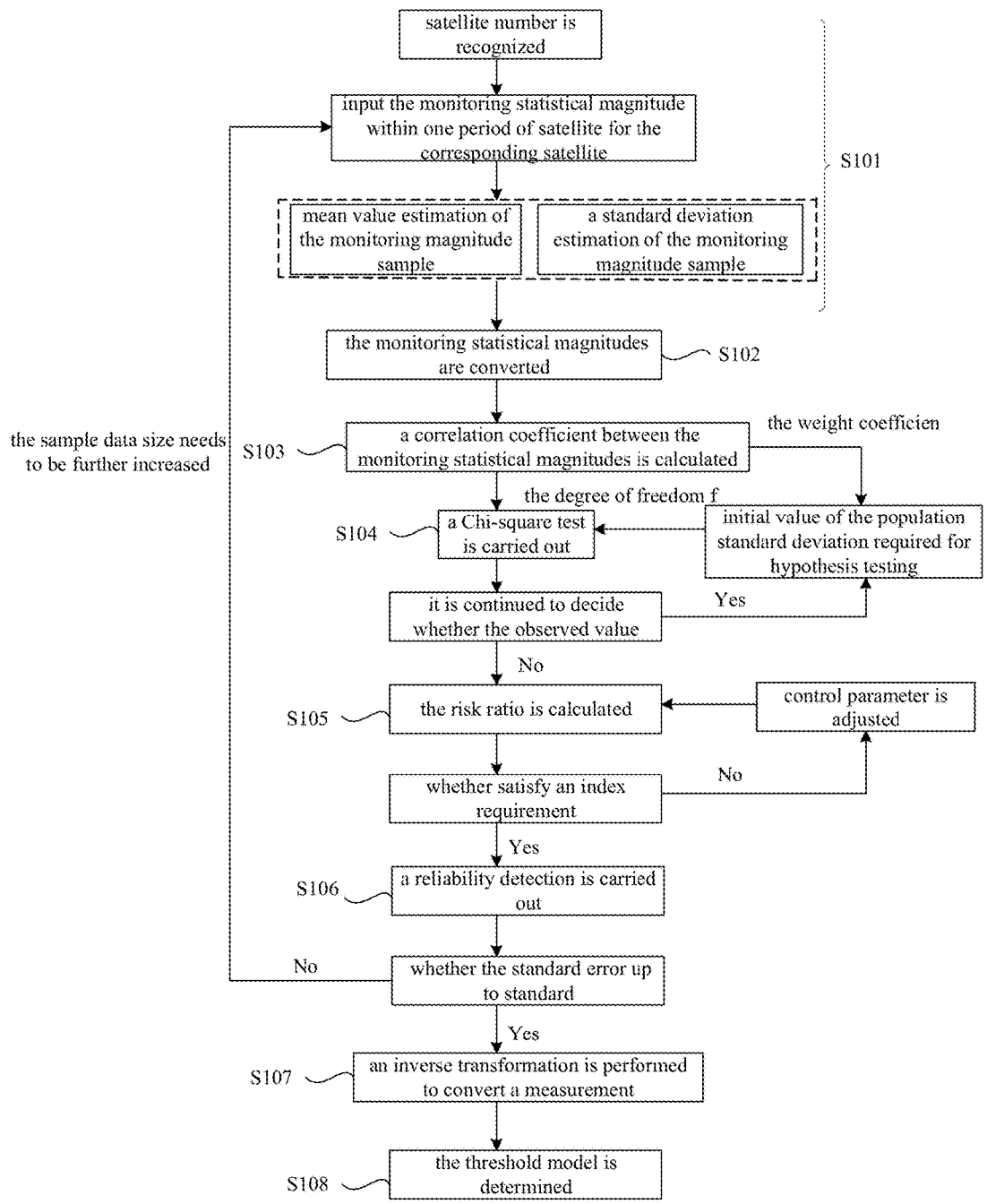
FIG. 2 illustrates a flow block diagram of a method for establishing a threshold model for integrity risk monitoring the Beidou ground-based augmentation system according to the present disclosure.

A detailed embodiment of a method for establishing the threshold model for integrity risk monitoring the Beidou ground-based augmentation system according to the present disclosure is provided in the following. FIG. 2 illustrates a flow block diagram of the method for establishing the threshold model for integrity risk monitoring the Beidou ground-based augmentation system according to the present disclosure. The method for establishing the threshold model for integrity risk monitoring the Beidou ground-based augmentation system includes the following steps.

In Step S101, data on the monitoring statistical magnitude are inputted.

A satellite number is recognized and overall data on the monitoring statistical magnitude within one period of satellite are inputted, wherein the data on the monitoring statistical magnitude include the ground side monitoring statistical magnitude and the on-board side monitoring statistical magnitude.

The first step of establishing the threshold model is to recognize the satellite number and input sample data, such that different satellite numbers are recognized based on different collected monitoring statistical magnitude satellite numbers (for example, No. 1 satellite 101, No. 2 satellite 102, and so on). The monitoring statistical magnitudes are closely linked with satellite running states, and thus it is needed to input the monitoring statistical magnitude within one period of satellite for the corresponding satellite.

After overall data on the monitoring statistical magnitude are inputted, a first-order moment and a second-order moment of a monitoring magnitude sample are calculated by using a sample parameter moment estimation. The sample parameter moment estimation includes a mean value estimation of the monitoring magnitude sample and a standard deviation estimation of the monitoring magnitude sample.

The first-order moment of the monitoring magnitude sample is calculated through a following method:

$$\mu_{sample} = \frac{1}{n}\sum_{i=1}^{n} X_i,$$

wherein X represents any a monitoring statistical magnitude, and n represents a sample data size; and the second-order moment of the monitoring magnitude sample is calculated through a following method:

$$\sigma_{sample} = \frac{1}{n}\sum_{i=1}^{n} (X_i - \mu_{sample})^2,$$

wherein X represents any a monitoring statistical magnitude, n represents a sample data size, and $\mu_{sample}$ represents the first-order moment of the monitoring magnitude sample. The calculated first-order moment and the second-order moment of the sample are used as mathematic bases of the next-stage measurement conversion parameter value and the initial value of the Chi-square test.

In Step S102, the monitoring statistical magnitudes are converted.

Figure 3:
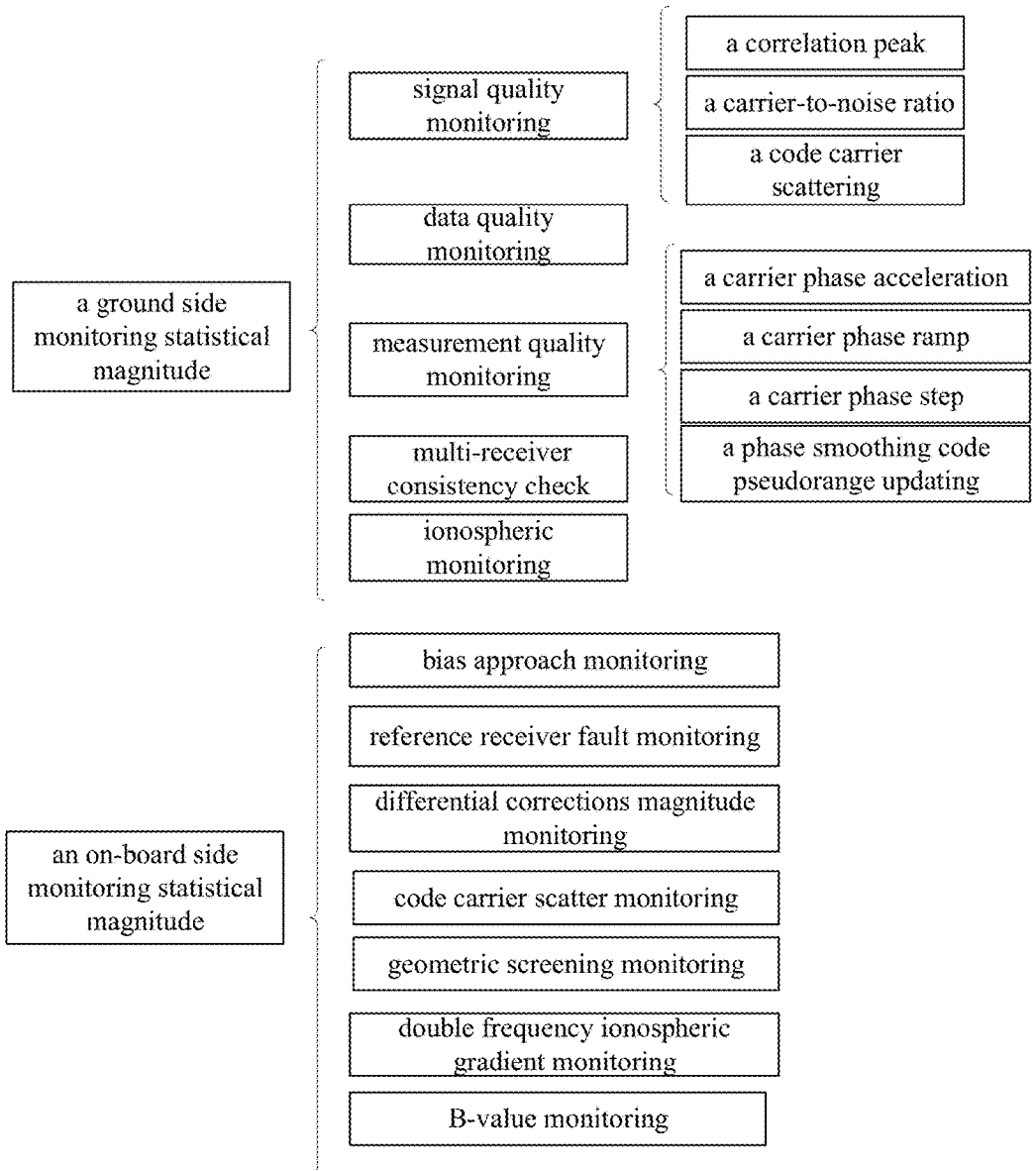
FIG. 3 illustrates a schematic diagram of classification of monitoring statistical magnitudes according to the present disclosure.

FIG. 3 illustrates a schematic diagram of classification of monitoring statistical magnitudes according to the present disclosure. The monitoring statistical magnitudes include a ground side monitoring statistical magnitude and an on-board side monitoring statistical magnitude, wherein the ground side monitoring statistical magnitude includes signal quality monitoring (SQM), data quality monitoring (DQM), measurement quality monitoring (MQM), multi-receiver consistency check (MRCC), and ionospheric monitoring. The SQM is classified into a correlation peak, a carrier-to-noise ratio, and a code carrier scattering. The MQM is classified into a carrier phase acceleration, a carrier phase ramp, a carrier phase step, and a phase smoothing code pseudorange updating.

The on-board side monitoring statistical magnitude includes bias approach monitoring (BAM), reference receiver fault monitoring (RRFM), differential corrections magnitude monitoring (DCMC), code carrier scatter monitoring (CCD), geometric screening monitoring (max ($|S_{ij}|$)), double frequency ionospheric gradient monitoring (DSIGMA) and B-value monitoring.

The ionospheric monitoring and the B-value monitoring are monitoring statistical magnitudes newly added for the GAST D.

With continuous development and improvement of GBAS approach service types, to cover all potential risks as more as possible, more and more monitoring statistical magnitudes appear, forms of the monitoring magnitudes are more and more complex, and different monitoring magnitudes have different measurement units.

To facilitate a comprehensive comparison of all the monitoring statistical magnitudes so as to more effectively utilize information obtained by measurement, measurement conversion is performed on the monitoring statistical magnitudes in accordance with the embodiments of the present disclosure.

Figure 4:
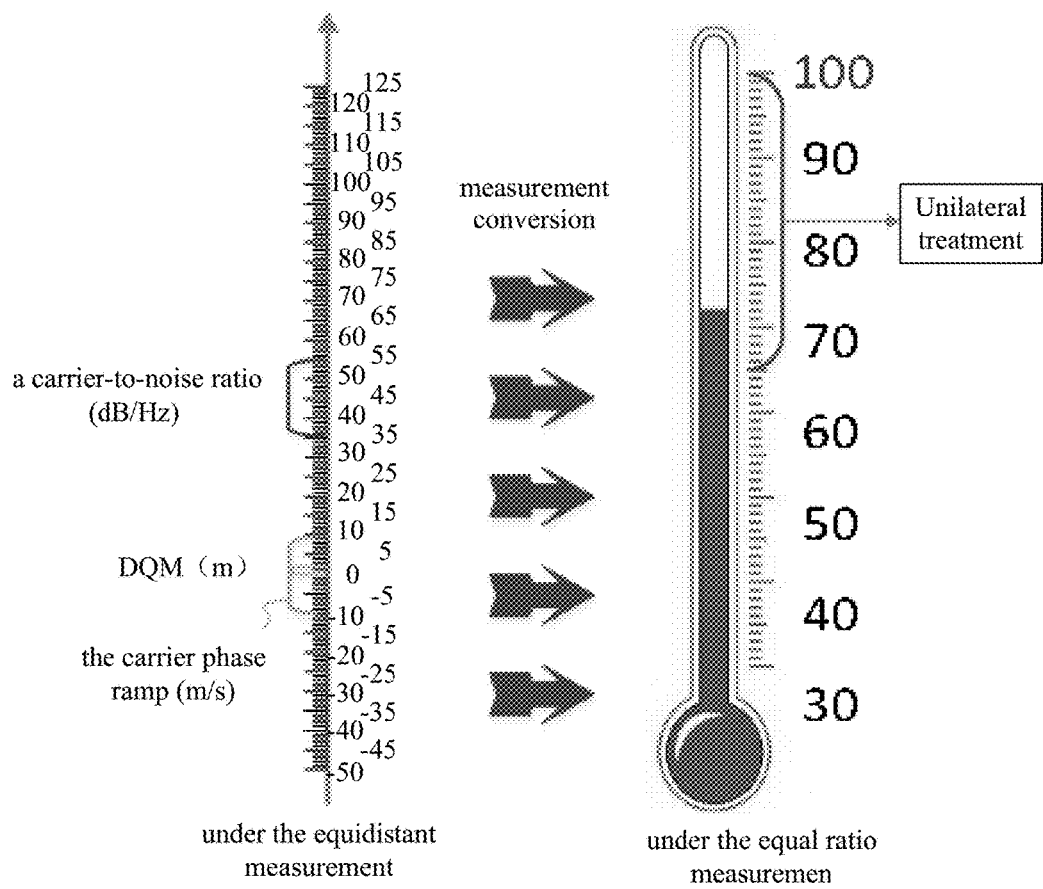
FIG. 4 illustrates a schematic diagram of equal ratio measurement conversion according to the present disclosure.

FIG. 4 illustrates a schematic diagram of equal ratio measurement conversion according to the present disclosure. The left side provides the monitoring statistical magnitude obtained after actual measurement. Taking the carrier-to-noise ratio as an example, under the equidistant measurement, the value range thereof falls in between 35 and 55, and the measurement unit thereof is dB/Hz. Taking the carrier phase ramp figure as an example, under the equidistant measurement, the value range thereof falls in between −10 and 10, and the measurement unit thereof is m/s. Taking the data quality monitoring (DQM) as an example, the value range thereof falls in between 0 and 2, and the measurement unit thereof is m. This makes the existing methods can only separate and process these monitoring magnitudes and calculate the threshold models respectively. However, in actual situations, integrity risks defined by these monitoring magnitudes are interrelated. Only by comprehensively processing and applying information of each monitoring magnitude can a more effective and reliable integrity risk monitoring threshold model be obtained. Therefore, in the present disclosure, the inputted overall data on the monitoring statistical magnitude are uniformly converted to equidistant measurements between 0 and 100, so as to conveniently compare all the information obtained.

The inputted overall data on the monitoring statistical magnitude are uniformly converted from an initial equidistant measurement to an equal ratio measurement. According to the embodiments of the present disclosure, before the inputted overall data on the monitoring statistical magnitude are uniformly converted from the initial equidistant measurement to the equal ratio measurement, a first-order moment and a second-order moment of a monitoring magnitude sample are calculated by using a sample parameter moment estimation, and the equal ratio measurement is calculated by using the first-order moment and the second-order moment of the monitoring magnitude sample.

The equal ratio measurement is calculated through a following method:

$$X^* = 100 - \left| \frac{X - \mu_{sample}}{\sigma_{sample}} \right|,$$

wherein X represents any a monitoring statistical magnitude, $\mu_{sample}$ represents the first-order moment of the monitoring magnitude sample corresponding to X, $\sigma_{sample}$ represents the second-order moment of the monitoring magnitude sample corresponding to X, and X* represents the monitoring statistical magnitude after being converted to the equal ratio measurement.

In the above-mentioned equal ratio measurement calculation process, a bilateral threshold is successfully converted to a unilateral threshold by way of normalization, then modulus and finally subtraction. The unilateral processing form greatly enhances the calculation efficiency. In the actual measurement, the sample mean value of the Beidou GBAS integrity risk monitoring magnitudes has higher stability. Therefore, as can be seen from the equal ratio measurement of the present disclosure, when a sample value of the monitoring magnitude is equal to the sample mean value, the value under the equal ratio measurement is 100. The more deviated from the sample mean value, the lower the value under the equal ratio measurement is.

In Step S103, a correlation coefficient between the monitoring statistical magnitudes is calculated.

The correlation coefficient between two monitoring statistical magnitudes is calculated to determine a degree of freedom f and a weight coefficient Wj required for hypothesis testing.

The correlation coefficient ρ between the two monitoring statistical magnitudes is calculated through a following method:

$$\rho_{X_1^* X_2^*} = \frac{\text{cov}(X_1^*, X_2^*)}{\sigma X_1^* \sigma X_2^*},$$

wherein $\text{cov}(X_1^*, X_2^*)$ represents a covariance between the monitoring statistical magnitudes $X_1^*$ and $X_2^*$ after being converted to the equal ratio measurement, $\sigma X_1^*$ represents a standard deviation of the monitoring statistical magnitude $X_1^*$ after measurement conversion, and $\sigma X_2^*$ represents a standard deviation of the monitoring statistical magnitude $X_2^*$ after measurement conversion.

The degree of freedom and the weight coefficient of the monitoring statistical magnitude are determined by calculating the correlation coefficient to serve as the mathematic basis of the Chi-square test threshold model.

Figure 5:
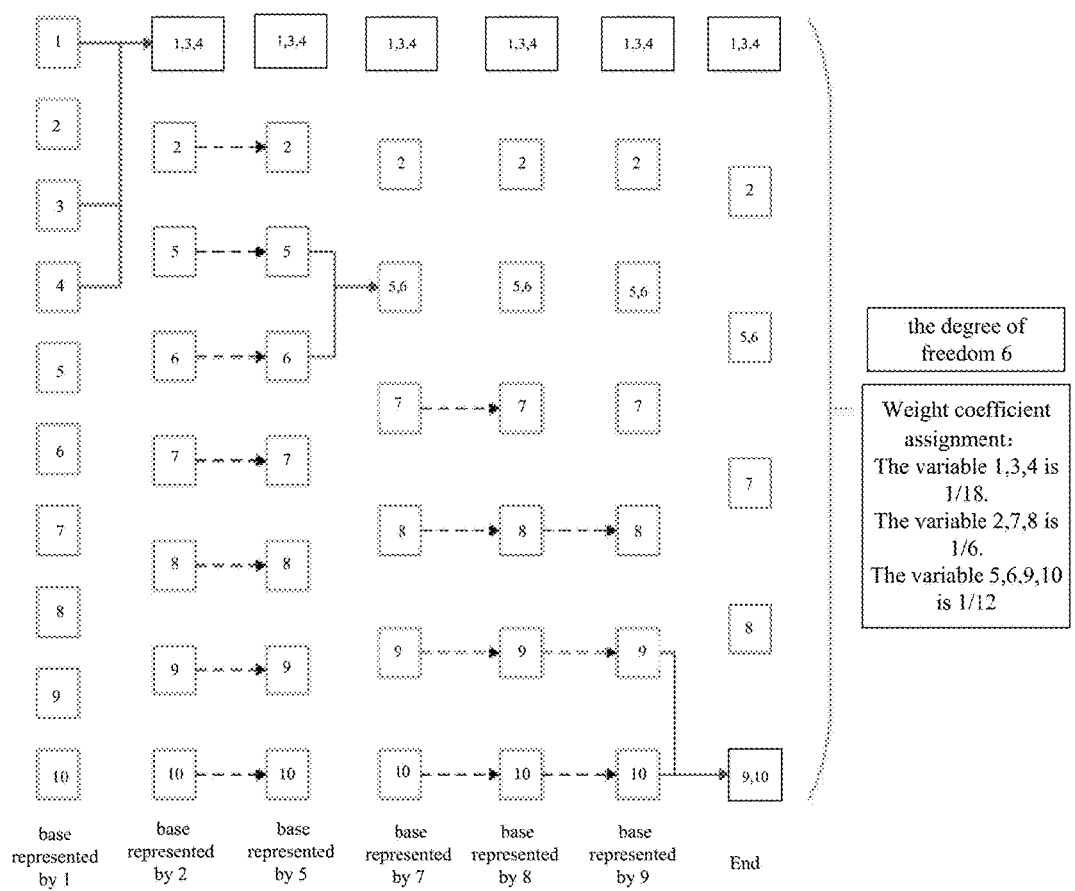
FIG. 5 illustrates a schematic diagram of determining a degree of freedom and a weight coefficient according to the present disclosure.

FIG. 5 illustrates a schematic diagram of determining the degree of freedom and the weight coefficient according to the present disclosure. Each small block represents one monitoring statistical magnitude. Reference is made by taking ten monitoring statistical magnitudes as examples. When this step is performed, the correlation coefficient between each monitoring statistical magnitude and all the other monitoring statistical magnitudes needs to be respectively calculated. The correlation coefficient between the monitoring statistical magnitude 1 and other monitoring statistical magnitudes is calculated with a base represented by 1. It is found that both the correlation coefficient between the monitoring statistical magnitude 1 and the monitoring statistical magnitude 3 and the correlation coefficient between the monitoring statistical magnitude 1 and the monitoring statistical magnitude 4 are greater than 0.8. This proves that the three monitoring statistical magnitudes tend to be linearly correlated, and thus they should be processed as the same statistical magnitude during hypothesis testing. In the process of taking the base represented by 2, it is found that the monitoring statistical magnitude 2 is uncorrelated with other monitoring magnitudes, and thus a next round of calculation is proceeded. It has proved that both the monitoring statistical magnitude 3 and the monitoring statistical magnitude 4 are correlated with the monitoring statistical magnitude 1, and thus in the next round of calculation, 5 serves as the base. By analogy, in the end, it is found that an approximate correlation exists between the monitoring magnitudes 1, 3 and 4, the monitoring magnitudes 5 and 6, and the monitoring magnitudes 9 and 10. As shown in the figure, there are six relatively independent small blocks in total at this moment, the degree of freedom fat this moment is 6, and the weight coefficient Wj of each monitoring statistical magnitude is obtained.

In Step S104, a Chi-square test is carried out.

An observed value of the Chi-square test statistical magnitude is calculated based on a sample standard deviation of each monitoring statistical magnitude under the equal ratio measurement and an initial value of a population standard deviation set for the weight coefficient and based on the degree of freedom and the initial value of the population standard deviation required for hypothesis testing.

When the population standard deviation of the monitoring magnitude is determined by using the Chi-square test, first it is needed to set an initial to-be-tested standard deviation $\sigma_0$. That is, there is put forward a hypothesis that the population standard deviation $\sigma=\sigma_0$, and then the correctness of the hypothesis is tested. In the present disclosure, the initial value of the Chi-square test comes from the initial value of the sample standard deviation and the weight coefficient obtained from Step S103.

The initial value of the population standard deviation is determined through a following method:

$$\sigma_0 = \sum_{j=1}^{m} W_j g \sigma_j,$$

wherein j represents a number of the monitoring statistical magnitude, m represents the total number of the monitoring statistical magnitudes, $W_j$ represents the weight coefficient, and $\sigma_j$ represents the sample standard deviation of each monitoring statistical magnitude under the equal ratio measurement.

The observed value of the Chi-square test statistical magnitude is calculated through a following method:

$$\chi^2 = \frac{(f-1)S_n^{*2}}{\sigma_0^2},$$

wherein f represents the degree of freedom, $\sigma_0$ represents the initial value of the supposed population standard deviation, $S_n^{*2}$ represents a corrected sample variance, the corrected sample variance $S_n^{*2}$ satisfies:

$$S_n^{*2} = \frac{1}{n-1} \sum_{i=1}^{n} (X_i^* - \overline{X}^*)^2,$$

wherein n represents the sample data size, $X_i^*$ represents the monitoring statistical magnitude after being converted to the equal ratio measurement, and $\overline{X}^*$ represents a mean value of the monitoring statistical magnitude after being converted to the equal ratio measurement.

A rejection region is determined based on a given significance level, and it is decided whether the observed value of the Chi-square test statistical magnitude is within the rejection region. It is repetitively tested if the observed value of the Chi-square test statistical magnitude is within the rejection region; otherwise a risk ratio is calculated in the next step (Step S105).

The given significance level is represented by $\alpha$, whose value generally depends on actual engineering requirements. Generally $\alpha=0.05$. Based on the formula $$\chi^2 = \frac{(f-1)S_n^{*2}}{\sigma_0^2}$$

for calculating the observed value of the Chi-square test statistical magnitude, values of $\chi_{\alpha/2}^2(n-1)$ and $\chi_{1-\alpha/2}^2(n-1)$ are calculated, and thus the rejection region W is determined.

Figure 6:
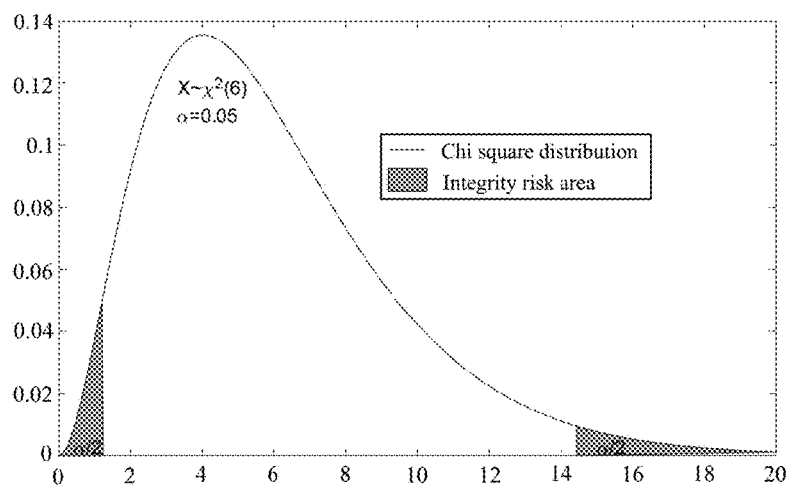
FIG. 6 illustrates a schematic diagram of Chi-square testing significance level according to the present disclosure.

$W=\{(x1,x2,\ldots,x_n):\chi^2 \geq \chi_{\alpha/2}^2(n-1) \text{ or } \chi^2 \geq \chi_{1-\alpha/2}^2(n-1)\}$ Advantages of using the Chi-square test lie in that the significance prominent portion in the Chi-square test is consistent with the integrity risk in the Beidou GBAS. FIG. 6 illustrates a schematic diagram of Chi-square testing significance level according to the present disclosure. The region (i.e., the region including the integrity risk) where the significance level $\alpha=0.05$ in the Chi-square test in which the degree of freedom is 6 is hereinafter referred to as the rejection region. By means of testing the Chi-square test significance level, the integrity risk such as a distance measurement source fault, an atmospheric layer fault, a ground subsystem layer and so on may be included. Therefore, it is continued to decide whether the observed value $\chi_0^2$ of the Chi-square test statistical magnitude is within the rejection region. If the observed value is not within the rejection region, this proves that the population standard deviation at this moment satisfies requirements for the significance level, and thus the next step may be started to calculate the risk ratio. However, if the requirements for the rejection region are not satisfied, this proves that the population standard deviation selected at this moment does not satisfy the requirements for the significance level. At this moment, it is ordered that $\sigma_0=\sigma_0+1$, and circular tests are repeated until the requirements for the significance level are satisfied.

In Step S105, the risk ratio is calculated.

A control parameter is added on the initial threshold model, and a risk ratio is calculated based on the number of sample points in excess of a threshold value and the total number of sample points. The control parameter is adjusted if the risk ratio does not satisfy an index requirement; otherwise a reliability detection is carried in the next step (Step S106).

For all the monitoring statistical magnitudes, the sample mean value μ has higher stability and remains unchanged within a small scope. Therefore, the initial threshold model Threshold=μ-$\sigma_0$ may be obtained after the population standard deviation satisfying the significance level is obtained by means of hypothesis testing.

However, it still cannot guarantee that the threshold model at this time definitely satisfies index requirements specified in the international standard. For example, the GAST C specifies that the integrity risk value is less than $2 \times 10^{-7}$. According to the embodiments of the present disclosure, the control parameter k is added on the initial threshold, and the control parameter k is adjusted to obtain the final threshold model:

$$\text{Threshold} = \mu - k\sigma_0.$$

The control parameter k needs to be adjusted based on indexes. That is, the number of sample points $P_{fault}$ in excess of the threshold value and the total number of sample points $P_{sum}$ need to be counted, and then the risk ratio $P_{risk}$ at this moment may be calculated:

$$P_{risk} = \frac{P_{fault}}{P_{sum}}.$$

If the calculated risk ratio satisfies the index requirements (the requirement of GAST C is $2\times10^{-7}$, and the requirement of GAST D is $2\times10^{-9}$), the next step (Step S106) may be performed. If the calculated risk ratio is not up to the index requirements, the control parameter k needs to be adjusted. The control parameter k directly acts on the coefficient of the population standard deviation, and thus coefficient adjustment is carried out based on a step of 0.1 during the adjustment.

In Step S106, a reliability detection is carried out.

A reliability value is calculated, and a standard error is calculated based on the reliability value. A sample data size is added if the standard error is not up to standard and the Steps S101-S105 are repeated. Otherwise an inverse transformation of measurement is carried out in the next step (Step S107).

To verify accuracy and consistency of the monitoring magnitude threshold model and verify the reliability detection required in credibility thereof, a reliability detection is carried out to ensure the reliability of the obtained threshold model. If the reliability detection is not up to standard, the sample data size needs to be increased to obtain a more reliable threshold model.

The reliability value is calculated through a following method:

$$\beta = \frac{m}{m-1} \cdot \frac{\sigma_0^2 - \sum \sigma_i^2}{\sigma_0^2},$$

wherein m represents the total number of the monitoring statistical magnitudes, $\sigma_0$ represents the initial value of the supposed population standard deviation, and $\Sigma \sigma_i^2$ represents a summation of each of the monitoring statistical magnitudes. It is to be noted that even though it is proved in the foregoing step that two monitoring statistical magnitudes are linearly correlated, the two monitoring statistical magnitudes here need to be respectively substituted for solving and cannot be processed as the same monitoring magnitude.

After the reliability $\beta$ is calculated out, the standard error in the processing procedure is calculated:

$$\text{Error}_{deal} = \sigma_0 \sqrt{1-\beta},$$

wherein $\sigma_0$ represents the initial value of the hypothetic population standard deviation, and $\beta$ represents the reliability value. If the calculated standard error satisfies engineering project requirements, the next step (Step S107) may be proceeded. If the calculated standard error does not satisfy the corresponding requirements, this indicates that the current result is not up to standard in reliability, and thus the sample data size needs to be further increased, and the foregoing steps (Steps S101-S105) need to be repeated.

Figure 7:
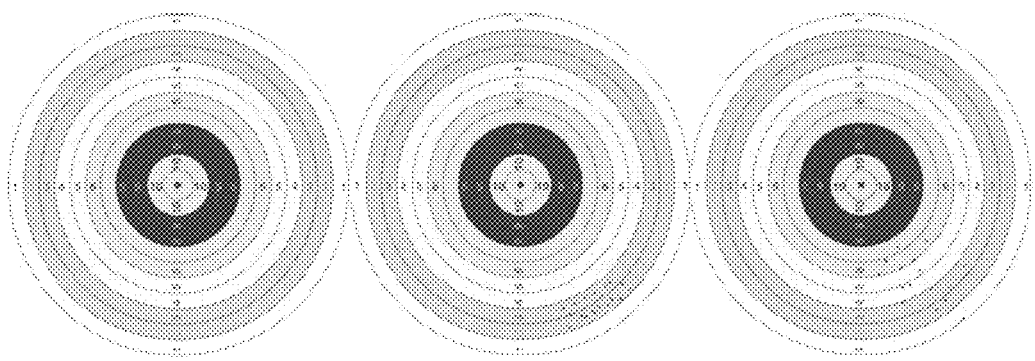
FIG. 7 illustrates a schematic diagram of a reliability detection according to the present disclosure.

The reliability detection needs to be performed because finiteness of the sample data may likely have a negative effect on the reliability in establishing the threshold model. FIG. 7 illustrates a schematic diagram of reliability detection according to the present disclosure. In the target figure of FIG. 7, the closer to the center, the higher the score is, and the less likely the integrity risk occurs. In the first figure (the leftmost target figure), the sample points are densely distributed within the black region. It is apparent that these sample points prove that the probability of occurrence of the integrity risk is low, and a stable and reliable threshold model may be obtained. In the second figure (the middle target figure), the sample points are densely distributed in the peripheral gray region. It is apparent that these sample points prove that the probability of occurrence of the integrity risk is high, but a stable and reliable threshold model also may be obtained. In the third figure (the rightmost target figure), the sample points are not densely distributed. At this time, the reliability detection is needed to determine the reliability of the conclusion. If the reliability detection does not meet the requirements, it is required to increase the sample data within one period of satellite, such that the reliability of the threshold model is improved.

In Step S107, an inverse transformation is performed to convert a measurement.

After all of the above steps are completed, it is necessary to continue to establish the threshold model by means of the inverse transformation for converting a unified measurement, and the inverse transformation is carried out to convert the unified measurement through the following method:

$$X = \begin{cases} -(100 - \text{Threshold}) \cdot \sigma_{sample} + \mu_{sample} \Rightarrow \text{Upper limit of threshold} \\ (100 - \text{Threshold}) \cdot \sigma_{sample} + \mu_{sample} \Rightarrow \text{Lower limit of threshold} \end{cases}.$$

Threshold represents the threshold model, $\mu_{sample}$ represents the first-order moment of the monitoring magnitude sample corresponding to X, and $\sigma_{sample}$ represents the second-order moment of the monitoring magnitude sample corresponding to X.

In Step S108, the threshold model is determined.

Through the above Steps S101-S107, the threshold model is obtained by utilizing an inverse transformation for converting a unified measurement.

The process of establishing the threshold model according to the present disclosure in total includes eight phases: recognizing a satellite number and inputting data, sample parameter moment estimation, measurement conversion of the monitoring magnitude, determining a degree of freedom between the monitoring magnitudes, Chi-square testing the population standard deviation, the standard index detection, the reliability detection, and the inverse transformation for converting a measurement. When calculating the threshold model according to the present disclosure, all the monitoring magnitudes are uniformly converted from the initial equidistant measurement to the equal ratio measurement, such that all the monitoring magnitudes may be comprehensively applied in establishing the threshold model.

When the measurement conversion is performed on the monitoring magnitudes, a bilateral threshold is converted to a unilateral threshold in measurement conversion of the monitoring magnitudes by way of normalization, then modulus and finally subtraction, i.e., $$X^* = 100 - \left| \frac{X - \mu}{\sigma} \right|,$$

such that calculation of a threshold is converted to a unilateral evaluation. This method is applicable to cases of population zero mean and population non-zero mean.

In the present disclosure, parameter moment estimation of the monitoring magnitude sample is used as a measurement conversion parameter value. After data input of the monitoring statistical magnitude is completed, parameter moment estimation of the monitoring magnitude within one period of satellite is used as the parameter value of next-phase measurement conversion.

The correlation coefficient between two monitoring statistical magnitudes is calculated according to the present disclosure:

$$\sigma_{X_1^* X_2^*} = \frac{\text{cov}(X_1^*, X_2^*)}{\sigma X_1^* \sigma X_2^*},$$

if the calculated correlation coefficient is greater than a critical value (the critical value generally is 0.8), it can be regarded that the two monitoring magnitudes are approximately linearly correlated, and the degree of freedom between the monitoring statistical magnitudes and the weight coefficient assigned to each of the monitoring statistical magnitudes need to be adjusted. The weight coefficient of each monitoring magnitude accounting for the total monitoring magnitudes is obtained by utilizing the correlation between two the monitoring statistical magnitudes, and then the initial value of the Chi-square test is set based on the weight coefficient of each monitoring magnitude. For the monitoring statistical magnitudes after the measurement conversion, the population standard deviation whose significance level satisfies the requirement (the occurrence of a significant case is consistent with the integrity risk) is found by means of the Chi-square test.

In the present disclosure, the threshold control parameter is adjusted by using an index of a GBAS approach service type. That is, the size of the control parameter k is adjusted based on requirements for the GBAS integrity risk (for example, the requirement of GAST C for the integrity risk index is $2\times10^{-7}$, and the requirement of GAST D for the integrity risk index is $2\times10^{-9}$) to ensure the validity of establishing the threshold model.

In the present disclosure, the reliability detection is utilized to detect the degree of consistency of reference data. If the reliability detection is not up to standard, this indicates that the sample size of the monitoring statistical magnitudes is insufficient to satisfy the consistency of statistical requirements, and at this moment, the sample data size needs to be increased, such that the measurement results are closer to a population true value, and the reliability of the threshold model is ensured.

According to the present disclosure, an effective integrity risk monitoring threshold model for the Beidou ground-based augmentation system is obtained based on collected data on the monitoring statistical magnitude and using all the monitoring statistical magnitudes, which can effectively reduce a false dismissal probability and a false alarm probability in the integrity monitoring process.

The threshold model established according to the present disclosure may be applied to integrity monitoring processing procedures of different airports.

Other embodiments of the present disclosure are conceivable and comprehensible to those skilled in the art in combination with description and practice of the present disclosure disclosed herein. It is intended that the specification and embodiments are considered as exemplary only, with a true scope and spirit of the present disclosure being indicated by the following claims.

What is claimed is:

1. A Beidou ground-based augmentation system integrity risk monitoring system, comprising a ground side and an on-board side, the on-board side comprising a processor and a memory, the processor receiving a ground side monitoring statistical magnitude and an on-board side monitoring statistical magnitude to establish a threshold model, and the memory storing the threshold model, wherein the threshold model is established based on following methods:

a) recognizing a satellite number and inputting overall data on the monitoring statistical magnitude within one period of satellite, the data on the monitoring statistical magnitude comprising the ground side monitoring statistical magnitude and the on-board side monitoring statistical magnitude;

b) uniformly converting the inputted overall data on the monitoring statistical magnitude from an initial equidistant measurement to an equal ratio measurement;

c) calculating a correlation coefficient between the two monitoring statistical magnitudes to determine a degree of freedom and a weight coefficient required for hypothesis testing;

d) calculating an observed value of a Chi-square test statistical magnitude based on a sample standard deviation of each monitoring statistical magnitude under the equal ratio measurement and an initial value of a population standard deviation set for the weight coefficient and based on the degree of freedom and the initial value of the population standard deviation required for hypothesis testing;

e) determining a rejection region based on a given significance level, deciding whether the observed value of the Chi-square test statistical magnitude is within the rejection region; and repetitively testing if the observed value of the Chi-square test statistical magnitude is within the rejection region; otherwise going to a next step;

f) adding a control parameter on the initial threshold model, and calculating a risk ratio based on the number of sample points in excess of a threshold value and the total number of sample points; adjusting the control parameter if the risk ratio does not satisfy an index requirement; otherwise going to a next step;

g) calculating a reliability value, calculating a standard error based on the reliability value; adding a sample data size if the standard error is not up to standard and repeating the Step a) to the Step f); otherwise going to a next step; and h) obtaining the threshold model by utilizing an inverse transformation for converting a unified measurement.

2. The system according to claim 1, wherein before uniformly converting the inputted overall data on the monitoring statistical magnitude from an initial equidistant measurement to an equal ratio measurement, a first-order moment and a second-order moment of a monitoring magnitude sample are calculated by using a sample parameter moment estimation.

3. The system according to claim 2, wherein the sample parameter moment estimation comprises a mean value estimation of the monitoring magnitude sample and a standard deviation estimation of the monitoring magnitude sample.

4. The system according to claim 2, wherein the first-order moment of the monitoring magnitude sample is calculated through a following method:

$$\mu_{sample} = \frac{1}{n}\sum_{i=1}^{n} X_i,$$

wherein X represents any a monitoring statistical magnitude, and n represents a sample data size; and
the second-order moment of the monitoring magnitude sample is calculated through a following method:

$$\sigma_{sample} = \frac{1}{n}\sum_{i=1}^{n} (X_i - \mu_{sample})^2,$$

wherein X represents any a monitoring statistical magnitude, n represents a sample data size, and $\mu_{sample}$ represents the first-order moment of the monitoring magnitude sample.

5. The system according to claim 4, wherein the equal ratio measurement is calculated through a following method:

$$X^* = 100 - \left|\frac{X - \mu_{sample}}{\sigma_{sample}}\right|,$$

wherein X represents any a monitoring statistical magnitude, $\mu_{sample}$ represents the first-order moment of the monitoring magnitude sample corresponding to X, $\sigma_{sample}$ represents the second-order moment of the monitoring magnitude sample corresponding to X, and X* represents the monitoring statistical magnitude after being converted to the equal ratio measurement.

6. The system according to claim 1, wherein the correlation coefficient between the two monitoring statistical magnitudes is calculated through a following method:

$$\rho_{X_1^* X_2^*} = \frac{\text{cov}(X_1^*, X_2^*)}{\sigma X_1^* \sigma X_2^*},$$

wherein cov($X_1^*$, $X_2^*$) represents a covariance between the monitoring statistical magnitudes $X_1^*$ and $X_2^*$ after being converted to the equal ratio measurement, $\sigma X_1^*$ represents a standard deviation of the monitoring statistical magnitude $X_1^*$ after measurement conversion, and $\sigma X_2^*$ represents a standard deviation of the monitoring statistical magnitude $X_2^*$ after measurement conversion.

7. The system according to claim 1, wherein the initial value of the population standard deviation is determined through a following method:

$$\sigma_0 = \sum_{j=1}^{m} W_j g\sigma_j,$$

wherein j represents a number of the monitoring statistical magnitude, m represents the total number of the monitoring statistical magnitudes, $W_j$ represents the weight coefficient, and $\sigma_j$ represents the sample standard deviation of each monitoring statistical magnitude under the equal ratio measurement.

8. The system according to claim 1, wherein the observed value of the Chi-square test statistical magnitude is calculated through a following method:

$$\chi^2 = \frac{(f-1)S_n^{*2}}{\sigma_0^2},$$

wherein f represents the degree of freedom, $\sigma_0$ represents the initial value of the supposed population standard deviation, $S_n^{*2}$ represents a corrected sample variance, the corrected sample variance $S_n^{*2}$ satisfies:

$$S_n^{*2} = \frac{1}{n-1}\sum_{i=1}^{n} (X_i^* - \overline{X}^*)^2,$$

wherein n represents the sample data size, $X_i^*$ represents the monitoring statistical magnitude after being converted to the equal ratio measurement, and $\overline{X}^*$ represents a mean value of the monitoring statistical magnitude after being converted to the equal ratio measurement.

9. The system according to claim 1, wherein the reliability value is calculated through a following method:

$$\beta = \frac{m}{m-1} \cdot \frac{\sigma_0^2 - \sum \sigma_i^2}{\sigma_0^2},$$

wherein m represents the total number of the monitoring statistical magnitudes, $\sigma_0$ represents the initial value of the supposed population standard deviation, and $\Sigma\sigma_i^2$ represents a summation of each of the monitoring statistical magnitudes.

* * * * *